United States Patent
Boivie et al.

(10) Patent No.: US 6,842,783 B1
(45) Date of Patent: Jan. 11, 2005

(54) SYSTEM AND METHOD FOR ENFORCING COMMUNICATIONS BANDWIDTH BASED SERVICE LEVEL AGREEMENTS TO PLURALITY OF CUSTOMERS HOSTED ON A CLUSTERED WEB SERVER

(75) Inventors: Richard Harold Boivie, Monroe, CT (US); Daniel Manuel Dias, Yorktown, NY (US); Colin George Harrison, Brookfield, CT (US); Eric M. Levy-Abegnoli, Nice (FR); Jean A. Lorrain, Vence (FR); Kiyoshi Maruyama, Chappaqua, NY (US); Pascal Pol Marie Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,603

(22) Filed: Feb. 18, 2000

(51) Int. Cl.[7] .................. G06F 15/173; G06F 15/16; G06F 11/00
(52) U.S. Cl. .................. 709/225; 709/232; 370/235
(58) Field of Search .................. 709/224, 232, 709/235, 225, 223; 370/235, 236.2, 237

(56) References Cited

U.S. PATENT DOCUMENTS

| | | | |
|---|---|---|---|
| 5,335,224 A | | 8/1994 | Cole et al. |
| 5,633,859 A | | 5/1997 | Jain et al. |
| 5,831,971 A | | 11/1998 | Bonomi et al. |
| 5,864,540 A | | 1/1999 | Bonomi et al. |
| 6,006,264 A | * | 12/1999 | Colby et al. .................. 709/226 |
| 6,041,354 A | * | 3/2000 | Biliris et al. .................. 709/226 |
| 6,119,235 A | * | 9/2000 | Vaid et al. .................. 713/201 |
| 6,272,110 B1 | * | 8/2001 | Tunnicliffe et al. .......... 370/232 |
| 6,304,552 B1 | * | 10/2001 | Chapman et al. ............ 370/232 |
| 6,324,184 B1 | * | 11/2001 | Hou et al. .................. 370/468 |
| 6,341,309 B1 | * | 1/2002 | Vaid et al. .................. 709/223 |
| 6,424,993 B1 | * | 7/2002 | Weber .................. 709/203 |
| 6,434,164 B1 | * | 8/2002 | Matsunaga et al. ......... 370/443 |
| 6,502,131 B1 | * | 12/2002 | Vaid et al. .................. 709/224 |
| 6,553,568 B1 | * | 4/2003 | Fijolek et al. .............. 725/111 |

FOREIGN PATENT DOCUMENTS

EP 1069801 A1 * 1/2001 .......... H04Q/11/04

OTHER PUBLICATIONS

Lamti, L. et al., "The fair shaper: an efficient mechanism for Internet bandwidth share over ATM in a multitasks OS", IEEE ATM Workshop Proceedings, pp. 56–64, May 1998.*
Padmanabhan, V.N., "Coordinated congestion management and bandwidth sharing for heterogeneous data streams", NOSSDAV'9 Workshop, vol. 288, pp. 187–190, Jun. 1999.*

* cited by examiner

*Primary Examiner*—Jason D. Cardone
(74) *Attorney, Agent, or Firm*—Richard M. Ludwin, Esq.; McGinn & Gibb, PLLC

(57) ABSTRACT

A method and system for controlling and guaranteeing a service level agreement (SLA) based on a communications outbound link bandwidth usage to a plurality of customers having electronic business activity hosted by at least one server as a server farm, includes monitoring the outbound communications bandwidth usage by each customer traffic to determine a level of service being provided to each customer with respect to the agreed service level agreement in each service cycle time per unit of time. The flow of incoming requests to each customer business activity application is controlled so as to guarantee a level of service previously agreed to the customer by queuing requests to the customer and by selectively dropping requests to the customer to guarantee the agreed service levels to the customer. The controlling process controls and guarantees each outbound link usage based service level agreement by controlling the flow of incoming requests to the at least one server.

25 Claims, 4 Drawing Sheets

For all i
 $Ra(i)=(1-a)Ra(i)+aR(i)$,
 $Ba(i)=(1-a)Ba(i)+aBm(i)$,
 $b(i)=Ba(i)/Ra(i)$.
where
 $Ra(i)$ represents averaged/smoothed number of requests
 $Ba(i)$ represents averaged/smoothed bandwidth usage
 $Bm(i)$ represents the measured/monitored bandwidth usage
 $b(i)$ represents the expected bandwidth usage by one request
 all of them in a fixed service cycle time.

FIG.4B

SYSTEM AND METHOD FOR ENFORCING COMMUNICATIONS BANDWIDTH BASED SERVICE LEVEL AGREEMENTS TO PLURALITY OF CUSTOMERS HOSTED ON A CLUSTERED WEB SERVER

FIELD OF THE INVENTION

The present invention relates generally to a world-wide network, and more particularly to those of Internet World Wide Web (WWW) sites of various owners hosted by a service provider using a cluster or group of servers and meeting with agreed upon service levels.

BACKGROUND OF THE INVENTION

The Internet is the world's largest network, and it has become essential in organizations such as government, academia, small, medium and large businesses as well as to individual consumers. Many businesses have started outsourcing their electronic business ("e-business") and electronic commerce ("e-commerce") Web sites to service providers instead of running their Web sites on their own server(s) and managing them by themselves.

Such a service provider needs to install a collection of servers (termed a Web Server Farm (WSF), Universal Server Farm (USF), or Web Server Cluster) which can be used by many different businesses to support their e-commerce and e-business. These business customers (e.g., the service provider's "customers") have different "capacity" requirements for their Web sites. The users of e-commerce (consumers, business partners, etc.) access the Web Server Farm by first logging into the Internet. The Web Server Farm (WSF) is connected to the Internet via high speed communications links such as T3 and OCx links. These links are shared by all the Web sites, and all the users who are accessing the services hosted by the Web Server Farm.

When businesses out-source their e-commerce and/or e-business to a service provider, they must get some guarantee on the services they are getting from the service provider for their sites. Once the service provider makes a commitment to a customer to provide a certain "level" of service (e.g., termed a Service Level Agreement (SLA)), the provider must guarantee that level of service to that customer.

A general service level agreement (SLA) on communications link bandwidth usage for a customer can be denoted by a pair of bandwidth constraints: the minimum guaranteed bandwidth B(i, min) and the maximum bandwidth bound B(i, max) for each i-th customer.

The minimum (or min) bandwidth B(i, min) is a guaranteed bandwidth that the i-th customer will receive regardless of the bandwidth usage by other customers. The maximum (or max) bandwidth B(i, max) is an upper bound on the bandwidth that the i-th customer may receive provided that some unused bandwidth is available (e.g., bandwidth not being currently used by other customers).

Therefore, the range between B(i, min) and B(i, max) represents bandwidth provided on an "available" or "best-effort" basis to a customer, and it is not necessarily guaranteed that the customer will obtain this bandwidth.

Generally, the unit cost to use the bandwidth up to B(i, min) is less than or equal to the unit cost to use the bandwidth between B(i, min) and B(i, max). Such a unit cost assigned to one customer may differ from those assigned to other customers.

In the environment of Web site hosting, where communications link(s) between the Internet and a server farm is shared by a number of customers (i.e., traffic to/and from the customer Web sites are sharing the communications link(s)), the bandwidth management on the outbound link (i.e., the link from a server farm to the Internet) is more important than the bandwidth management on the inbound link since the amount of traffic on the outbound link is several orders of magnitude greater than that on the inbound link.

Furthermore, in most cases, the inbound traffic to the server farm is directly responsible for the outbound traffic generated by the server farm. Therefore, the service level agreements (B(i, min), B(i, max)) are generally applied on the outbound link bandwidth usage.

A conventional method for leaky bucket traffic shaping uses fair queuing collision arbitration. This method uses a set of queues and virtual finishing time for scheduling Asynchronous Transfer Mode (ATM) cell traffic. The method could be implemented to regulate packet traffic to enforce the minimum bandwidth SLA, B(i, min) to each customer.

Another conventional method for shaping traffic in a packet-switched network uses a set of queues and the conformance time to shape packet traffic. The method can be used to regulate packet traffic to enforce the minimum bandwidth SLA, B(i, min) to each customer.

Some commercial products (e.g., Xedia Access Point (www.Xedia.com) and Phasecom's SpeedClass (www.speed-demon.com) can be used to regulate directly the outbound traffic to meet with the (minimum, maximum) bandwidth SLA for each customer.

However, while the conventional systems and methods such as those mentioned above, could be reasonably applied to enforce service level agreements (SLAs) on the outbound link usage by each customer (and on customer traffic class or type), some can only support the minimum bandwidth SLA and some can support the (minimum, maximum) bandwidth SLA.

A major problem of these systems and methods is that they enforce the outbound bandwidth SLA by throttling (i.e., dropping some of) the traffic already generated by specific source (IP) addresses.

A major problem arises when some packets must be dropped because either the outbound link has been congested for a sustained period of time so that some queues are running out of space, and/or a particular customer's outbound link usage has been exceeding the maximum bandwidth SLA and its queue(s) has filled up. That is, when a queue has filled up, packets coming to that queue are randomly dropped. This means the packet-dropping affects many responses from a server farm since each response consists of many packets. This dropping of packets triggers many Transmission Control Protocol (TCP) retransmission, which leads to even further retransmission of packets for error recovery, causing thrashing and then eventually leading to a slowdown of many connections or disconnection of connections.

Another problem of dropping outbound packets is wasting server resources in generating responses which cannot be delivered to end users (i.e., servers are kept busy for generating undeliverable responses, yet they could have been used for generating responses for customers whose outbound bandwidth usage are below the minimum guarantees).

Yet another problem is, classification of outbound traffic is limited since the outbound packet does not say for which type request the packet was generated. This will limit the degree to which differentiated services could be applied in controlling bandwidth usage.

SUMMARY OF THE INVENTION

In view of the foregoing and other problems, disadvantages and drawbacks of the conventional systems and methods, an object of the present invention is a system and method to guarantee and deliver the (minimum, maximum) based communications link bandwidth Service Level Agreements (SLAs) to customers whose applications (e.g., Web sites) are hosted by a server or a server cluster.

Another object of the present invention is to prevent any single customer's traffic in the server or server cluster from monopolizing (e.g., "hogging") the entire bandwidth resource and penalizing others.

Yet another object of the present invention is to provide a feedback method and system for enforcing the outbound link bandwidth SLAs by throttling and shaping the inbound traffic to a server or a server cluster.

A further object of the present invention is to provide differentiated services to various types of traffic within a defined class of traffic by supporting multilevel selective-packet-drop criteria.

A still further object of the present invention is to serve the incoming requests by priority order and not necessarily in their order of arrival.

Yet another object of the present invention is to provide a method and system for classifying and shaping traffic using various levels from the Internet Protocol (IP) addresses to User Resource Locators (URLs).

Another object of the invention is to provide a method and system for maximizing the usage of the outbound link bandwidth and to provide fair usage to various classes of traffic.

Yet another object of the present invention is to provide a method and system for maximizing the potential service revenue in allocating unused bandwidth to various classes of traffic.

A still further object of the invention is to provide a method and system for avoiding the generation of output from a server or a server cluster if that output could not be delivered to end users.

Another object of the present invention is to provide a method and system for dropping requests and/or connections to minimize the negative business impact to customers.

In a first aspect of the present invention, a system and method are provided to guarantee and deliver the communications link bandwidth-based Service Level Agreements (SLAs) to customers whose applications (e.g., Web sites) are hosted by a server or a server farm. A method of controlling and guaranteeing a service level agreement (SLA), based on a communications outbound link bandwidth usage to a plurality of customers having electronic business activity hosted by at least one server as a server farm, includes a) monitoring the outbound communications bandwidth usage by each customer traffic to determine a level of service being provided to each customer with respect to the agreed service level agreement in each service cycle time per unit of time; and b) controlling a flow of incoming requests to each customer business activity application so as to guarantee a level of service previously agreed to the customer by queuing requests and by selectively dropping requests to the customer to guarantee the agreed service levels to the customer. The controlling step controls and guarantees each outbound link usage based service level agreement by controlling the flow of incoming requests to the at least one server.

The Service Level Agreements preferably are in the form of (minimum, maximum) bandwidth bounds where the minimum bandwidth represents the guaranteed bandwidth while the maximum bandwidth represents the upper bound to the as-available use bandwidth. A customer may have an SLA for each type traffic. The system enforces the outbound link bandwidth SLAs by throttling and shaping inbound traffic to a server farm.

Preferably, incoming traffic is classified into various class/type queues. Each queue has multiple water-levels to trigger selective-dropping of packets prior to dropping any new arriving packets. Traffic in queues is scheduled and shipped to a server farm using a real-time scheduling algorithm that support and enforce the (minimum, maximum) bandwidth-based SLA to each customer traffic. The system uses the information on the outbound link bandwidth usage by various class traffic as a primary means to throttle and shape inbound traffic to a server farm. The scheduling algorithm looks for an opportunity to increase the revenue to a server farm operator when allocating bandwidth resources beyond the minimum bandwidth SLAs.

With the unique and unobvious structure and method of the invention, the (minimum, maximum) based communications link bandwidth SLAs are guaranteed and delivered to customers whose applications are hosted by a server or a server cluster. Further, single customer traffic (a class traffic belonging to a single customer) in the server or server cluster are prevented from monopolizing an entire bandwidth resource at the expense of other customers. Along these lines, the usage of the outbound link bandwidth is maximized and yet fair usage is provided to various classes of traffic. Additionally, feedback is provided for enforcing the outbound link bandwidth SLAs by throttling and shaping the inbound traffic to a server or a server cluster.

Additionally, with the present invention, differentiated services are provided to various types of traffic within a defined class of traffic by supporting multilevel selective-packet-drop criteria. Further, incoming requests are served by priority order and not necessarily in their order of arrival. Additionally, traffic is classified and shaped using various levels such as from the Internet Protocol (EP) addresses to User Resource Locators (URLs). The potential service revenue is maximized in allocating unused bandwidth to various classes of traffic. Further, the output generation from a server or a server cluster is avoided if that output cannot be delivered to end users. Thus, server resources are conserved, and unnecessary output (packets) are not generated and subsequently dropped. Further, requests and/or connections are dropped to minimize the negative business impact to customers.

BRIEF DESCRIPTION OF THE DRAWINGS

The foregoing and other objects, aspects and advantages will be better understood from the following detailed description of a preferred embodiment of the invention with reference to the drawings, in which:

FIG. 4B illustrates a method of computing b(i), the expected bandwidth usage per a request that is admitted to a server farm.

DETAILED DESCRIPTION OF THE PREFERRED EMBODIMENTS OF THE PRESENT INVENTION

Figure 1:
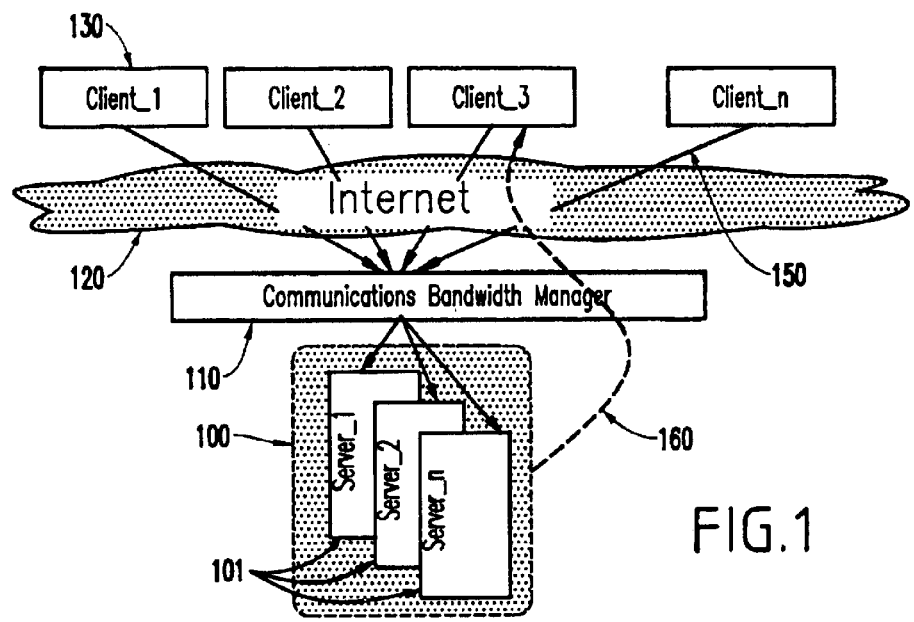
FIG. 1 illustrates an overall system and environment of the present invention.

Referring now to the drawings, and more particularly to FIGS. 1–7, an embodiment of the present invention will be described herein below.

FIG. 1 shows the overall system 100 and environment for the present invention. As shown in FIG. 1, clients 130 (e.g., Client_1, Client_2, Client_3, . . . , Client_n) on a worldwide network (e.g., the Internet) 120, typically running Web browsers, make requests for web data located on a cluster of Web servers 100.

The requests arrive at a Communications Bandwidth Manager (CBM) 110. The CBM 110 presents a single IP address to the Web server cluster. The CBM 110 may queue incoming requests in a set of queues (as described in further detail below) in order to satisfy service level agreements (also described below). The CBM selects a request from the queues, selects one of the servers 101 (e.g., Server_1, Server_2, Server_3, etc.) to service the request, and sends the request to that server.

The selected server receives the Web request, services it, and sends the response directly back to the client 130 (e.g., Client_3) along path 160. The return path 160 between the servers 100 and the Internet 120, is shared by the cluster of servers. This path 160 carries the bulk of the Web server bandwidth load.

The present invention is directed at controlling the allocation of this link bandwidth among multiple customer Web sites hosted on the Web server cluster 100, by controlling incoming Web requests at the CBM 110.

Figure 2:
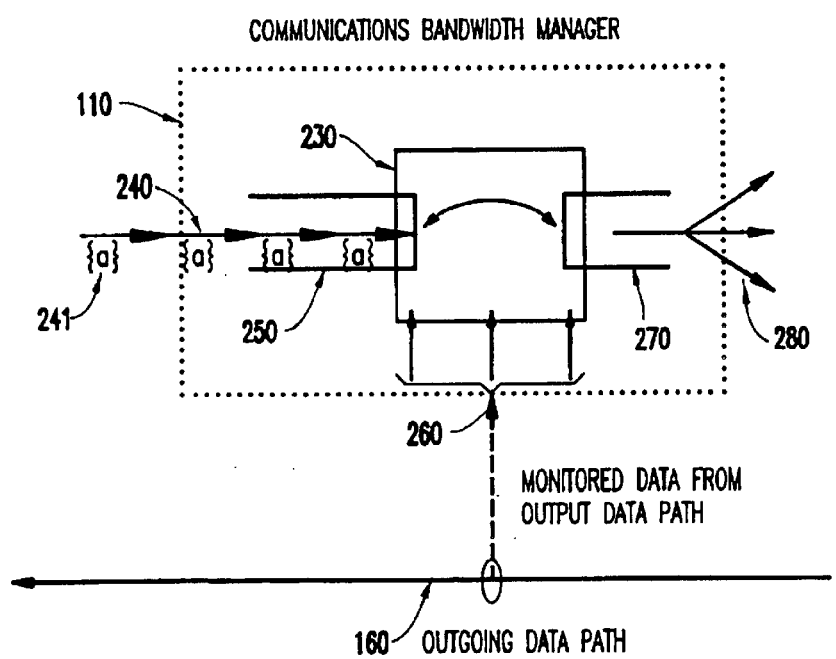
FIG. 2 illustrates a communications bandwidth manager 1110 according to the present invention for managing and monitoring a communications bandwidth on an output data path.

FIG. 2 illustrates the main concept of the present invention embodied in the Communications Bandwidth Manager (CBM) 110. The CBM 110 receives incoming (i.e., inbound) Web requests 240 from Web clients 130, on input link 241.

The input requests 240 are queued in a set of queues 250 (e.g., in order of arrival time). The requests in a queue 250 are serviced first-in, first out (FIFO) within each particular class (type) of requests. While FIG. 2 only shows a single queue 250, there exists queues for each traffic class for each customer. That is, a customer may have a single queue or multiple queues. If there are multiple queues, there are queues for each traffic type (e.g., class, priority, etc.). Thus, within each of the classes, the requests are serviced in a FIFO manner. Once, the request arrives in FIFO, the request is placed into a predetermined queue based on the customer, different customer's, Web site, server, etc. Hence, within each particular queue, the FIFO processing is preserved but not across different queues.

In addition to Web input requests, the input requests 240 include packets associated with the ongoing Web requests, such as acknowledgment packets.

The acknowledgment packets contain information on the quantity of outbound data that is being acknowledged, as specified in the conventional protocols, such as the specification of the TCP/IP (Transmission Control Protocol/Internet Protocol). This information may be used to estimate the volume of data that was sent out on the outgoing path 160 from the server 101.

As illustrated in FIG. 2, the outgoing path 160 may be monitored, in place of monitoring acknowledgment packets (e.g., generated by the server and indicating, for example, the number of data bytes delivered/received by a customer).

The path 160 carries the outbound traffic (i.e., responses to requests). Hence, monitoring the output on the outgoing data path 160 can be monitored and it can be observed how much output is being generated. If the amount of bandwidth being used by a particular customer exceeds the number of bandwidth per the SLA, then feedback can be generated to reduce the number of inbound requests being accepted.

Thus, the present invention provides a feedback loop, so as to provide monitored data 260 indicating the bandwidth on output path 160 being used by each of the Web sites hosted on the Web server cluster 100.

This monitored data 260 may be obtained directly by monitoring the output path 160 (e.g., monitoring the flow and the available bandwidth) at each of the Web servers in the cluster.

Based on the monitored data 260 (or the data contained in acknowledgment packets), configuration information (e.g., the connectivity between the CBM and servers) and accumulated information (e.g., server performance data) based on operation of the cluster, the CBM 110 selects from the queued incoming requests 240 (e.g., based on the exemplary scheduling processes shown in FIGS. 4A and 5A which describe the criteria for selecting certain requests over others), selects a Web server node 101 (e.g., based on a determination made by a conventional load balancer or the like which selects one node over another) to service the request, and forwards the request 280 to the selected server 101.

Based on the load of the outgoing path 160, some incoming requests may accumulate in queues 250. Thus, if traffic is heavy (e.g., above a predetermined threshold), some or all of the queues 250 may overflow, or some incoming requests may get delayed for a time period beyond a threshold. In these cases, the CBM 110 selects one or more incoming requests and discards them. Hence, once the queue is backed up, then there may be a delay of the incoming requests and a discarding of requests. Upon the queue becoming full, the incoming requests coming to a particular queue may be discarded in order of arrival. It is noted that the scheduler determines whether to admit (or not admit) a request. Typically, requests in a queue will not be dropped, but only those request newly-arriving will be dropped.

Alternatively, for these "to-be discarded" requests, the CBM may either directly, or via a selected server, return a message to the Web client 130 that the server complex is overloaded. There may be a dedicated server to return such a message (e.g., not to process requests, but only to return such "Server Busy" messages). Once, for example, a browser receives such a message, the browser can proceed to a next stage. Otherwise, the browser must wait until a "time out" message is received. After the "time out" the browser would move to a next process.

For example, in an Internet browser, when "CNN" is clicked, the "CNN" server will bring up a template, and within the template there are instructions to the Internet browser to "click" on various fields so that the template can be filled with content (e.g., images, text, etc.). Such "clicks" by the browser are made transparent to the user, to obtain the plurality of information. When the browser cannot obtain something, then the browser must retransmit the request. However, to avoid this, the dedicated server described above could be employed, thereby freeing the browser for other tasks.

Figure 3:
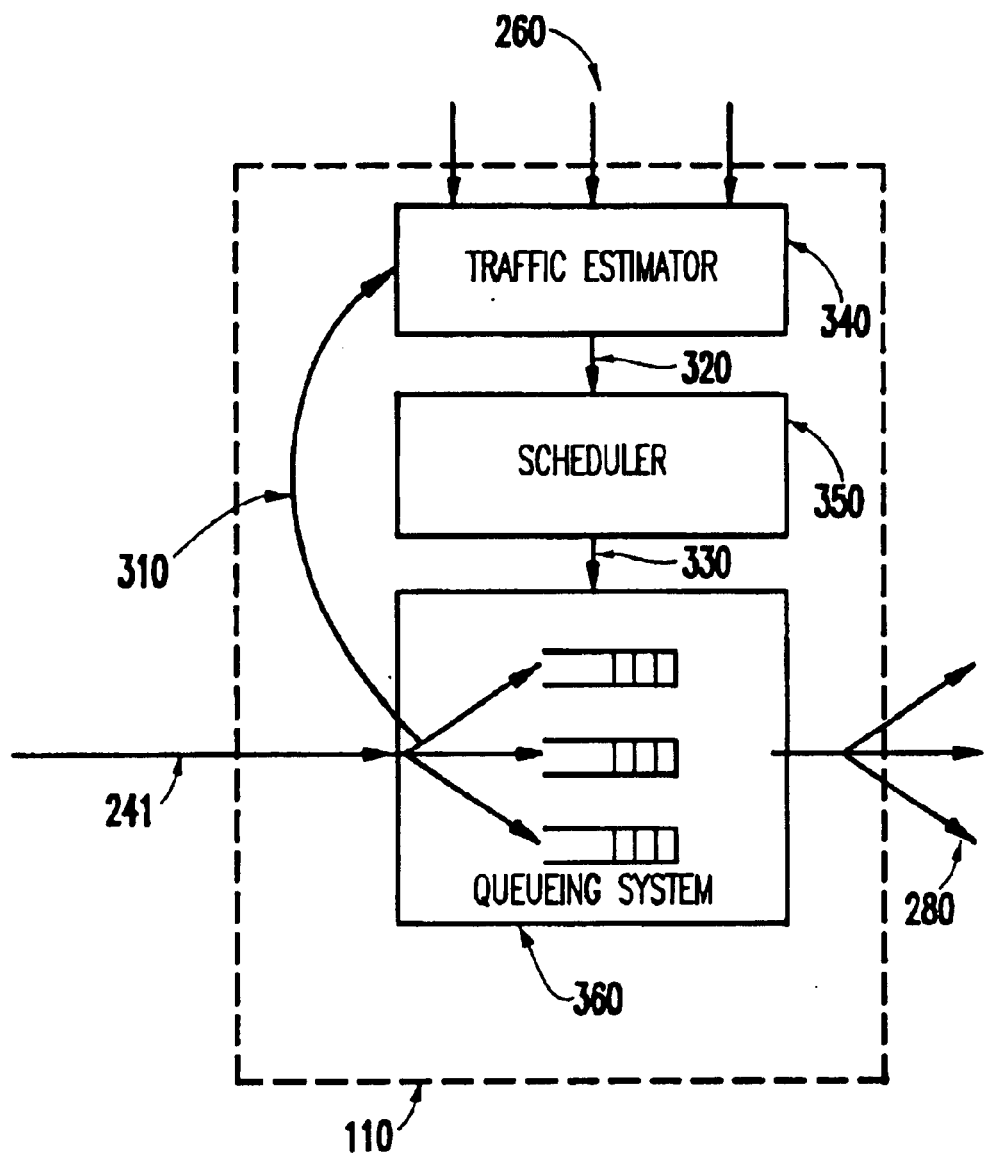
FIG. 3 illustrates the components of the Communications Bandwidth Manager 110 including a traffic estimator 340, a scheduler 320, and a queuing system 360.

FIG. 3 shows the components of the CBM 110. Incoming Web requests on input link 241 are placed in the queuing system 360. Monitored data 260 on the usage of the outgoing data path 160 arrive, and are gathered, at the traffic estimator 340. The traffic estimator may also gather the output load information from acknowledgment packets that arrive at the queuing system 360, via link 310.

The traffic estimator compiles the load information, and inputs the composed information to a scheduler component 350 over link 320. Based on the data from the traffic estimator, service level agreement (SLA) information (e.g., provided by the server(s)), and other configuration information (e.g., the connectivity between the CBM and servers), the scheduler 350 selects a request in the queuing system 360, and determines the server node 011 to service the request, and sends the selected request to the server node over link 280.

The scheduler 350 also determines if requests or other associated packets in the queuing system 360 are to be discarded, or whether a direct response indicating an overloaded condition is to be sent to the client Web browser.

Exemplary Scheduling Method

Figure 4A:
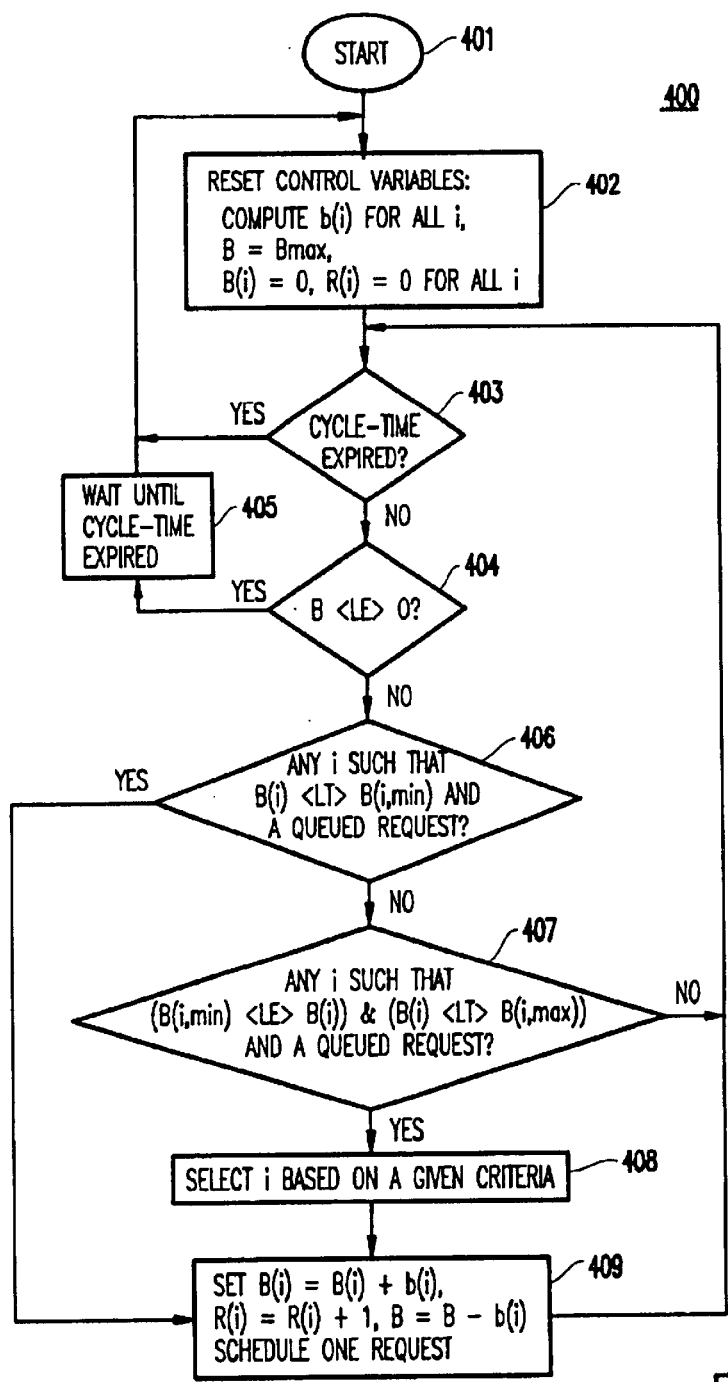
FIG. 4A illustrates a flowchart of an inbound traffic scheduling method 400.

FIG. 4A shows the scheduling method/algorithm 400 for inbound requests to a server farm after the requests have been queued in various queues 360.

The scheduling method 400 starts at step 401. The rest of steps (e.g., 402 through 409) will be repeated in a preset service cycle time. Step 402 resets control variables such as b(i), B, B(i) and R(i) for all class i. Here, b(i) represents the expected outbound link bandwidth usage in a service cycle time had a request in the class i been admitted to the server farm, B represents the current available bandwidth space that is set to Bmax at the beginning of each service cycle time (e.g., Bmax is the maximum usable bandwidth available on the outbound link in a service cycle time), B(i) represents the expected bandwidth usage had R(i) number of requests been dispatched to a server farm and R(i) represents the number of requests scheduled (and dispatched) thus far within the cycle time.

Step 403 determines whether or not a given service cycle time has expired. If it has expired (e.g., "YES"), then the method loops back to step 402. If the given service cycle time has not yet expired (e.g., "NO"), then step 404 checks whether or not any bandwidth is left for use. If no space is available (i.e., B is less-than-or-equal-to 0, denoted by B<LE>0), step 405 is executed, and then goes back to step 402.

If some bandwidth space is available (i.e., B<LT>0, B greater than zero), then the algorithm executes 406 and checks if there is any queue i such that a request is in that queue and its planned bandwidth usage is less than (<LT>) its minimum bandwidth SLA, B(i, min).

Step 406 guarantees the minimum bandwidth SLA. If the condition of the step 406 is "YES", then the algorithm schedules (and dispatches) one request from queue i and updates control variables; B(i)=B(i)+b(i), R(i)=R(i)+1, and B=B−b(i), and then goes back to step 403.

If the condition in step 406 is "NO" (i.e., as of this moment, every class has received the minimum bandwidth SLA service), then step 407 is executed, in which the algorithm determines whether there is class i such that there is a request in that queue and its bandwidth usage is less than its maximum bandwidth SLA, B(i, max).

If the condition in step 407 is "NO", then the method loops back to step 403. If the condition 407 is "YES", then step 408 is executed and class i is selected. The selection of a class is based on any given criteria predetermined by the designer. Examples of these criteria are priorities, weights assigned to classes, which class pays more than others, which class should receive preferential treatment over others, etc.

Once a class is selected in step 408, step 409 is executed to update the control variables, and then loops back to step 403. Steps 406, 407 and 408 provide the best effort services defined by the range between the minimum bandwidth SLA, B(i, min) and the maximum bandwidth SLA, B(i, max).

That is, for purposes of the invention, "best effort services"means that for each customer there is an SLA. Within the SLA, the customer is typically guaranteed a minimum bandwidth, or rate (bytes/bits per second) generated and delivered by their server. Thus, there is a minimum guaranteed level of service (e.g., 1 MBits per second guaranteed). There also typically is a range of additional between the minimum guarantee and a maximum bandwidth which the customer may be offered (e.g., 2 Mbits per second for a total of 3 Mbits per second), to service additional users coming into the customer's Web server and thus the Web server may generate a lot more than 1 Mbit per second of traffic. The range between 1 Mbit per second (minimum bandwidth) and 3 Mbit per second (maximum) is termed the "best efforts" range (also the "as available" range). When the customer starts using the bandwidth in this range, the customer is charged for such usage. This bandwidth beyond the minimum is not guaranteed and the customer may not get it, depending upon other customer's usage and SLAs.

FIG. 4B describes how b(i) in step 402 of FIG. 4A can be computed. b(i) is derived by dividing Ba(i) by Ra(i) where Ba(i) represents the averaged/smoothed bandwidth usage that is derived from the measured or monitored bandwidth usage Bm(i) in the immediately preceding cycle time, and Ra(i) represents the averaged/smoothed number of requests.

FIG. 4B shows one way of smoothing by using a constant "a" where a is a value between zero and one. The averaging/smoothing is used to absorb "spikes" (e.g., mitigate the effect of spikes on the waveform) to derive statistically meaningful values. There are many other conventional means to obtain the averaged or smoothed value as are known by one of ordinary skill in the art.

The scheduling method described above and shown in FIG. 4A attempts to utilize the currently-available bandwidth as much as possible.

The method 400 can be modified easily to be applied to control and regulate the outbound link bandwidth usage directly to meet the (min, max) SLAs, similar approach used by the conventional products. Such a modification is related to the computation of b(i) in Step 402 in FIG. 4A and in FIG. 4B. Instead of "computing" b(i), the value b(i) can be "obtained" from the packet that is being scheduled and dispatched. (i.e., each packet carries its length information, and thus this packet length information can be used as b(i) in stead of computing b(i) as described in FIG. 4b). This is possible since the method is applied directly to the traffic on the outbound link from the server farm to the Internet.

The CBM described in this invention can be implemented by hardware or software or both. For example, the CBM may be implemented by operating a computer, as embodied by a digital data processing apparatus, to execute a sequence of machine-readable instructions. These instructions may reside in various types of programmable signal-bearing media.

Thus, this aspect of the present invention is directed to a programmed product, including signal-bearing media tangibly embodying a program of machine-readable instructions executable by a digital data processor to perform the above method.

Hence, in addition to the hardware and process environment described above, a different aspect of the invention includes a computer-implemented method according to the present invention, as described above, for enforcing communications bandwidth based on service level agreements to a plurality of customer hosted on a clustered web server, as described above. As an example, this method may be implemented in the particular hardware environment by executing a sequence of machine-readable instructions in the signal-bearing media.

With the present invention, a closed-loop control is provided whereby the outbound traffic (e.g., responses) provides the control of the incoming traffic (e.g., requests).

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of controlling and guaranteeing a service level agreement (SLA) based on a communications outbound link bandwidth usage to a plurality of customers having electronic business activity hosted by at least one server as a server farm, said method comprising:

a) monitoring said outbound communications bandwidth usage by each customer traffic to determine a level of service being provided to each customer with respect to the agreed service level agreement it each service cycle time per unit of time, b) controlling a flow of incoming requests to each customer business activity application so as to guarantee a level of service previously agreed to for one or more said customers by at least one of queuing and by selectively dropping requests to a business activity application for one or more said customers in a manner that maintains the agreed service levels, wherein said controlling controls aid guarantees each outbound link usage based service level agreement by controlling the flow of incoming requests to a server or group of servers.

2. The method as set forth in claim 1, wherein said communications resource for service level agreements comprises an outbound communications link from said at least one server to said network which sends responses from said server farm.

3. The method as set forth in claim 1, wherein said communications resource customer traffic generated comprises a server farm having a plurality of servers, which is controlled by throttling the traffic to said server farm.

4. The method as set forth in claim 1, wherein said communications resource customer traffic generated comprises a server farm, having at least one server, which is controlled by throttling the traffic to said server farm.

5. A communications system, comprising:

a worldwide network for communicating with a plurality of customers;

a manager, operatively coupled to said worldwide network, for controlling and guaranteeing a service level agreement (SLA) for at least one said customer based on monitoring a communications outbound link bandwidth usage by each said customer, and at least one server functioning as a server farm, operatively coupled to said manager, said plurality of customers having electronic business activity hosted by said at least one server as said server farm;

wherein said outbound link bandwidth usage is controlled by controlling a flow of incoming requests by selectively dropping requests for said electronic business activity, in a manner such that said service level agreement is maintained as agreed.

6. The system according to claim 5, wherein said manager comprises:

an output link for receiving incoming requests from customers; and a set of queues for queuing the incoming requests.

7. The system according to claim 6, wherein said incoming requests are queued in order of arrival time and are serviced first-in, first out (FIFO) within each predetermined traffic class of requests.

8. The system according to claim 7, wherein said queues are provided for each traffic class for each customer.

9. The system according to claim 8, wherein the incoming requests include acknowledgment packets which contain information on the quantity of outbound data that is being acknowledged, so as to estimate a volume of data that was output on the outgoing path from the server.

10. The system according to claim 8, wherein said manager monitors an outgoing data path to determine a number of data units delivered to a customer.

11. The system according to claim 10, wherein said manager, based on monitoring of said outgoing data path, determines if an amount of bandwidth being used by a customer exceeds a bandwidth amount per a service level agreement, such that feedback is generated to reduce the number of inbound requests being accepted for any said customer whose current bandwidth exceeds the bandwidth amount in said service level agreement.

12. The system according to claim 5, wherein said manager comprises a Communications Bandwidth Manager (CBM) presenting a single address to the at least one server cluster.

13. The system according to claim 12, wherein said manager includes a set of queues for queuing incoming requests.

14. The system according to claim 13, wherein said manager selects a request from the queues, selects one of the at least one server to service the request, and sends the request to that server.

15. The system according to claim 14, wherein said selected server receives the request, services said request, and sends a response directly back to said customer along a data output path, wherein a portion of the path between said at least one server and said worldwide network is shared by a cluster of servers.

16. The system according to claim 15, wherein said manager controls an allocation of said outgoing data path along multiple customer sites hosted on the server cluster, by controlling incoming requests at the manager.

17. The system according to claim 8, wherein said manager further comprises a traffic estimator for gathering monitored data on the usage of the output data path, said traffic estimator also gathering output load information from said acknowledgement packets that arrive at the set of queues.

18. The system according to claim 17, further comprising a scheduler for receiving compiled load information from said traffic estimator, wherein, based on the data from the traffic estimator, and service level agreement (SIA) information provided by an operator, said scheduler selects from requests in the queues, and for a selected request determines a server node to service the request, and sends the selected request to the server node.

19. The system according to claim 18, wherein said scheduler determines if requests or associated packets in the queues are to be discarded, or whether a direct response indicating an overloaded condition is to be sent to a customer.

20. The system according to claim 5, wherein said worldwide network comprises the Internet.

21. The system according to claim 20, wherein said customers output requests on said Internet for web data located on a cluster of servers.

22. A signal bearing medium tangibly embodying a program of machine-readable instructions executable by a digital processing apparatus to perform a method of controlling and guaranteeing a service level agreement (SLA) based on a communications outbound link bandwidth usage to a plurality of customers having electronic business activity hosted by at least one server as a server farm, said method comprising:
   a) monitoring said outbound communications bandwidth usage for each customer to determine a level of service being provided to said each customer with respect to the agreed service level agreement in each service cycle time per unit of time; and
   b) controlling a flow of incoming requests to said business activity application for one or more said customers so as to guarantee a level of service previously agreed to for one or more said customers by at least one of queuing requests to said custom and selectively dropping requests to one or more said customers to maintain the agreed service levels.

23. A method of controlling and guaranteeing a service level agreement (SLA) based on the communications outbound link bandwidth usage to a plurality of customers whose e-business and e-commerce are hosted by a server or a set of servers as a server farm, said method comprising:
   a) monitoring said outbound communications bandwidth usage by each customer traffic to determine a level of service being provided to each customer with respect to an agreed service level agreement in each "service cycle time" per unit of time;
   b) controlling a flow of incoming requests to each customer eBusiness/eCommerce application so as to guarantee a level of service previously agreed to for one or more said customers by at least one of queuing requests and selectively dropping requests to said eBusiness/eCommerce application for one or more said customers in a manner that maintains the agreed service levels.

24. A method of guaranteeing a service level agreement (SLA) based on a communications outbound link bandwidth usage to a plurality of customers having electronic business activity hosted by at least one server, said method comprising:
   a) monitoring said outbound communications bandwidth usage by each customer traffic to determine a level of service being provided to said each customer with respect to an agreed service level agreement in each service cycle time per unit of time; and
   b) controlling a flow of incoming requests to each said customer business activity application so as to guarantee a level of service previously agreed to for one or more said customers by at least one of queuing and selectively dropping requests to said customer business activity application for one or more said customers in a manner that maintains the agreed service levels,
   wherein said controlling controls and guarantees each outbound link usage based service level agreement by controlling the flow of incoming requests to the at least one server.

25. A system for controlling and guaranteeing a service level agreement (SLA) based on a communications outbound link bandwidth usage to a plurality of customers having electronic business activity hosted by at least one server as a server farm, said system comprising:
   a) means for monitoring said outbound communications bandwidth usage by each customer traffic to determine a level of service being provided to each customer with respect to an agreed service level agreement in each service cycle time per unit of time, and
   b) means for controlling a flow of incoming requests to each customer business activity application so as to guarantee a level of service previously agreed to for one or more said customers by at least one of queuing requests and selectively dropping requests to said customer business activity applications to maintain the agreed service levels.

* * * * *